Aug. 27, 1940.  C. S. BAKER  2,212,631
COMPRESSOR REGULATOR
Filed March 22, 1939  2 Sheets-Sheet 1
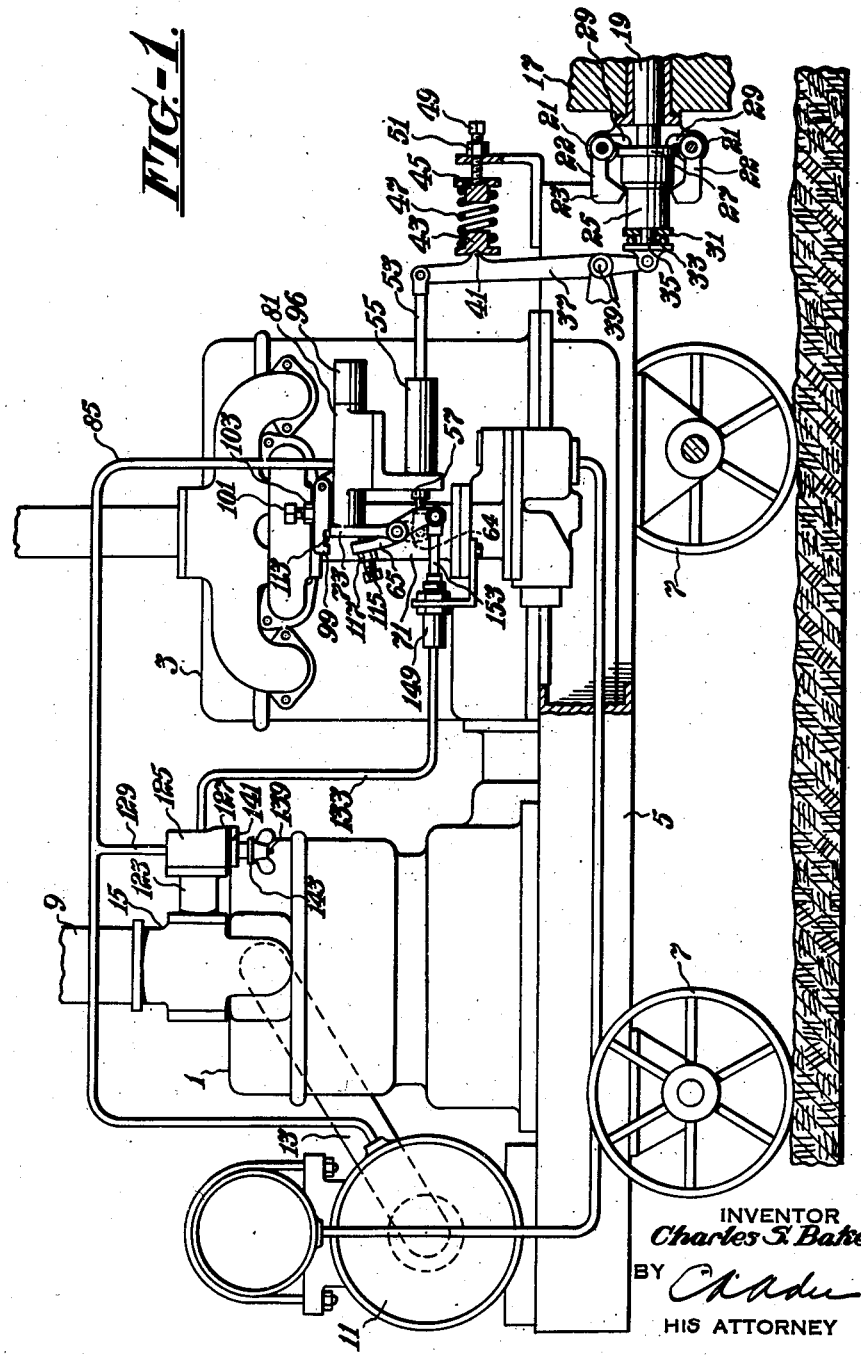
INVENTOR
Charles S. Baker
BY
HIS ATTORNEY Aug. 27, 1940.  C. S. BAKER  2,212,631
COMPRESSOR REGULATOR
Filed March 22, 1939   2 Sheets-Sheet 2
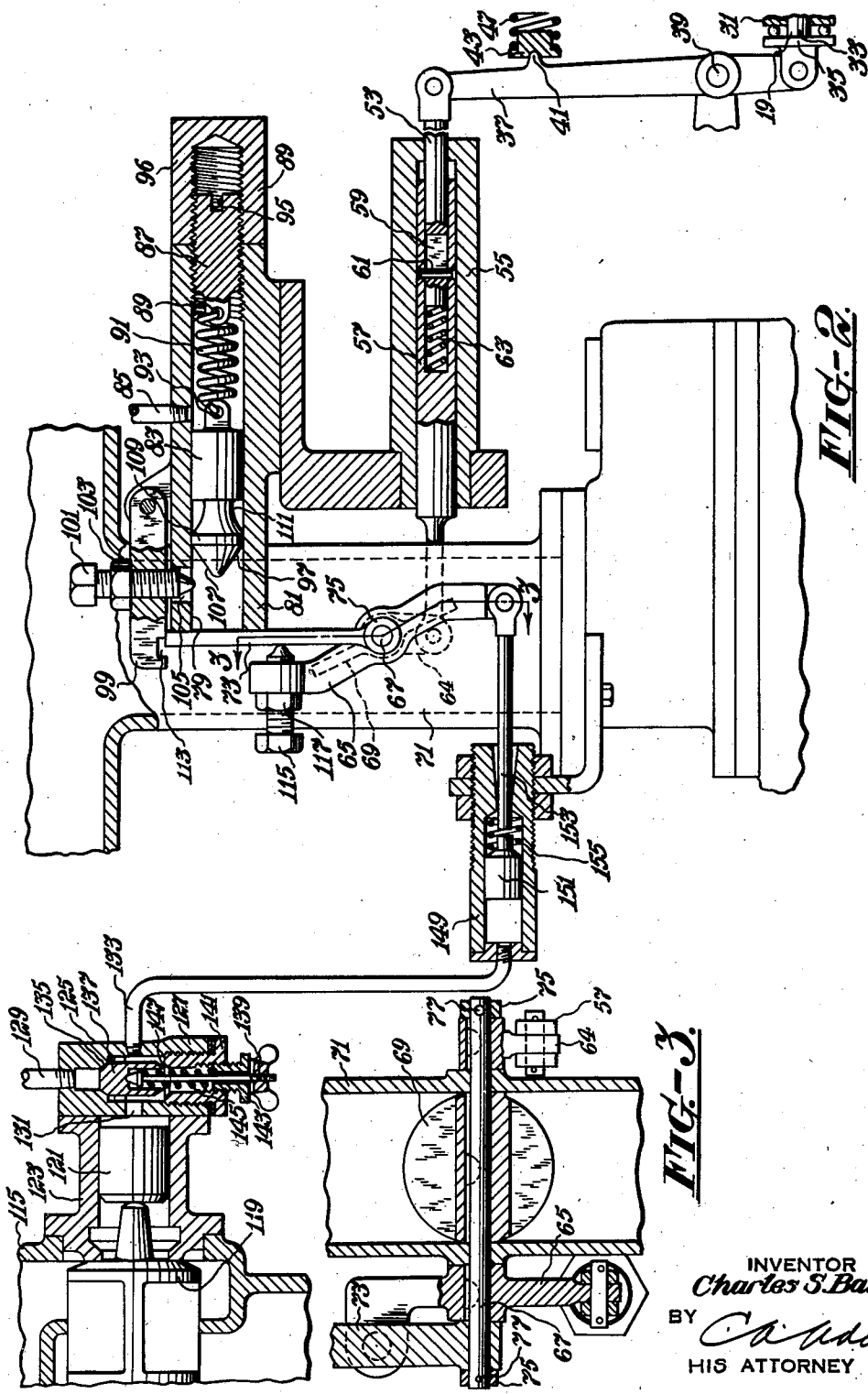
INVENTOR
*Charles S. Baker*
BY
HIS ATTORNEY Patented Aug. 27, 1940

2,212,631

UNITED STATES PATENT OFFICE 2,212,631

COMPRESSOR REGULATOR

Charles S. Baker, Corning, N. Y., assignor to Ingersoll-Rand Company, Jersey City, N. J., a corporation of New Jersey Application March 22, 1939, Serial No. 263,346

17 Claims. (Cl. 230—4)

This invention relates to regulators for motor driven fluid compressors and more particularly to regulating apparatus for varying the speed of the motor in conformance with the required output of the fluid compressor within certain limits.

A motor driven fluid compressor unit usually comprises a compressor adapted to be driven by an internal combustion engine. The compressor supplies a storage tank, forming part of the unit, with fluid under pressure. In ordinary installations, when the fluid pressure in the receiver tank has reached a maximum allowable pressure, a device provided on the compressor unloads the compressor or, in other words, prevents the further discharge of fluid to the storage tank; and, at the same time, the motor is slowed to the minimum rate of speed. Thereafter, if the pressure in the storage tank falls to a point where it must be replenished in order to supply the needs of the tools operated by the fluid, the unloading device again operates to permit the compressor to deliver fluid to the storage tank. At the same time, the speed of the motor is increased to the maximum speed.

Under certain load conditions the compressor will unload and reload at frequent intervals and the motor will be accelerated and decelerated with the result that the motor is constantly hunting for the proper speed to supply the demands of the load on the compressor. This results in a very unsteady and uneconomical operation of the unit.

It is, therefore, an object of the present invention to provide means whereby the compressor unit may be operated at a speed which will, in most instances, satisfy the load conditions without operating at a greater speed than the load requires.

Another object is to provide a speed regulating apparatus whereby the speed of the compressor unit is progressively regulated by the compressor discharge pressure within a predetermined pressure range.

A still further object is to provide means whereby the speed of the compressor unit is changed to a minimum speed when the compressor is unloaded.

Another object is to provide means whereby the speed of the motor is progressively regulated in accordance with the compressor discharge pressure when the compressor is loaded and the speed is reduced to a minimum speed when the compressor is unloaded.

A still further object is to provide a means whereby the progressive regulation of the motor speed is prevented after a predetermined discharge pressure has been reached.

Still another object is to provide means whereby the motor may be reduced to a minimum speed after the progressive regulation of motor speed has ceased due to the occurrence of a predetermined discharge pressure.

These and other objects will be readily apparent from the following specification of which the drawings form a part.

Similar reference numerals refer to similar parts in the drawings.

Figure 1 is a view partly in section illustrating the present invention as applied to a fluid compressor unit. A portion of the governor is increased in size in order to show the details more clearly.

Figure 2 is a view in section of the regulating apparatus and unloading mechanism shown in Fig. 1 constructed in accordance with the principles of this invention, and Figure 3 is a sectional view of the connections between the throttle valve and the regulating apparatus as shown in Fig. 1.

Referring to Fig. 1, the compressor unit comprises a fluid compressor 1 adapted to be driven by an internal combustion motor 3. Both the motor and the compressor are supported by the frame 5 mounted on wheels 7. Fluid is supplied to the compressor by the inlet conduit 9 and is removed from the compressor to the storage or receiver tank 11 by the conduit 13. Between the conduit 9 and the compressor 1 is the unloading device, generally indicated at 15.

As is customary, the speed of the internal combustion motor 3 is regulated by a governor which prevents excessive motor speeds. Only a portion of the governor, generally indicated at 17, is shown in Fig. 1, since the details of the governor form no part of the present invention. As shown, the governor consists of a shaft 19 directly connected to the cam shaft (not shown) of the motor. An extension on the shaft 19 (not shown) has securely fastened thereto the governor weight support 21. Pivotally mounted on the support 21 are levers 22 which carry the weights 23. Surrounding the extension of the shaft supporting the governor weight support 21 is a movable cap 25 provided with a flange 27 designed to bear against arms 29, on the levers 22.

The end of the cap 25 is closed by the plate 31 having an aperture therein to receive the pin 33 extending from the clevis plate 35. Between the plates 31 and 35 are placed ball bearings to enable the cap 25 and plate 31 to rotate without rotating the plate 35.

As will be seen, the plate 35 is pivotally connected to the lever 37, fulcrumed at 39 on the base of the engine, and having an abutment 41 to bear against the spring guide 43. Between the spring guide 43 and a second spring guide 45 is placed the governor spring 47. The tension of the governor spring 47 may be regulated to predetermine the maximum allowable motor speed since the position of the spring guide 45 is determined by the bolt 49. The more spring 47 is compressed the higher the speed setting of the governor since more centrifugal force is required to move weights 23 to their outermost position. The bolt 49 is secured to the frame 5 and is locked in position by the lock nut 51. As the speed of the motor increases the centrifugal force moves the weights 23 to their outermost position. In doing so, the levers 29 move the cap 25 and plate 31 out from the shaft 19. This movement will move the clevis plate 35 outwardly to pivot lever 37 and tend to compress the governor spring 47. The governor spring 47 thus serves the purpose of resiliently holding the weights 23 in their retracted position.

At the upper end of the lever 37 is the clevised rod 53 which is pivotally secured thereto. The clevised rod 53 extends within the casing 55 and within the tubular rod 57 which projects into the casing 55 as shown in Fig. 2. A slot 59 is formed in the rod 53 in which is placed a pin 61 secured in the wall of the tubular rod 57. Between the end of the clevised rod 53 and the end of the tubular portion of rod 57 is the spring 63.

With this construction, it will be apparent that the rod 53 may, under certain conditions, move with respect to the rod 57. When such movement occurs, the pin 61 will move in the slot 59. If the rod 53 is moved toward the left, the rod 57 will be moved to change the throttle valve position to reduce the speed as will be explained hereinafter. The portion of the tubular rod 57 extending without the casing 55 is pivotally connected to the lever 64 and, in turn, the lever 64 is keyed to the spindle 67 on which is fastened the throttle or butterfly valve 69 in the intake manifold 71 of the motor. A throttle lever 73 is rotatably mounted on the spindle 67 and is held on the spindle by any suitable means, as for instance, the ring 75 and pin 77. Lever 73 extends from the spindle 67 to a point adjacent the bore 79 in the casing 81. Within the bore 79 is a piston 83 which is subjected to receiver pressure by connecting the bore with the receiver tank 11 through the conduit 85. The opposite end of the bore is threaded to receive plug 87 which has an aperture 89 to receive one end of the spring 91, the other end of which is secured in the aperture 93 formed on the piston 83.

The degree of pressure necessary to move the piston 83 toward the left is determined by the tension of the spring 91 and to that end the plug 87 is provided with a slot 95 to receive a suitable tool for turning the plug 87 to adjust the spring tension. The outer end of the plug 87 is protected by a cap 96.

An abutment 97, formed as an integral part of piston 83, is designed to contact the lever 73 when the piston is moved to the left by the pressure of the fluid in the receiver tank. On the outer wall of the casing 81 is pivotally mounted the latch 99 which carries a bolt 101 and lock nut 103. The bolt 101 extends through the latch 99 and into the casing 81 through a suitable aperture 105. The latch 99 is designed to engage the lever 73 and to hold it from further movement under certain receiver tank pressure conditions. As the piston 83 is moved toward the left by the pressure of the fluid in the receiver tank against the tension of spring 91 the abutment 97 will strike the bolt 101 before it contacts the lever 73.

The periphery of the abutment 97 is designed as a cam surface and as the surface 107 strikes the bolt 101 the bolt will be raised gradually, reaching the highest point when the surface 109 is in contact therewith. This, of course, raises the latch 99 and leaves the lever 73 free to rotate about the spindle 67. Continued movement to the left allows the head of the bolt 101 to contact surface 111 on the abutment and to lower the latch 99 gradually until the lever 73 rests in the slot 113. Thereafter, upon a further increase in the receiver tank pressure there will be no corresponding movement of the lever 73.

Since lever 65 is keyed to the spindle 67, similarly to lever 64, it will, upon rotation, rotate the throttle valve 69 in a corresponding direction. Movement of lever 65 is accomplished by the lever 73 and to this end another bolt 115 with an appropriate lock nut 117 extends through the lever 65 and can be adjusted to bear against the lever 73. The bolt 115 serves as an adjusting means and determines the minimum loaded speed of the compressor.

By this arrangement, when the compressor is started, the throttle valve 69 is held wide open by the governor and, if the speed becomes too high, the governor will close the throttle. As the pressure in the receiver tank increases, the piston 83 will move to the left pushing lever 73 against lever 65 to close the valve 69. If the pressure should now fall, the piston will move to the right and thus open the throttle valve to increase the speed of the compressor in order to supply the load demanded.

It should be noted that when the piston moves out to close the throttle valve 69, the governor will act in a direction to open the throttle. Under such a condition the spring 63 in the rod 57 will be compressed and the throttle will be moved toward the closing position even though the governor is positioned for a wide open throttle. Since this spring 63 is of a fairly light tension, the piston 83 is opposed only by this spring during the slowing down of the motor rather than by the governor spring 47. Thus, it is possible to use the same regulator with different size governors and different speed settings of the governors since the spring 63 is a fixed load. Furthermore, the piston 83 can regulate the speed of the motor until a predetermined high discharge pressure is reached at which time the lever 73 will be locked against further movement. Accordingly, it is possible to regulate the speed of the motor while the compressor is loaded.

However, if the pressure increases, it is essential that the flow of pressure fluid to the receiver tank be terminated and to this end the unloading mechanism 15 is provided. This mechanism comprises a valve 119 located between the inlet conduit 9 and the compressor 1.

The valve is shown in Fig. 3 in its open position to maintain the load on the compressor. In order to move the valve to its unloaded or closed position, the piston 121 in the casing 123 is moved and bears against an extension on the valve 119.

The admission of fluid under pressure to the casing 123 to actuate piston 121 is controlled by the auxiliary valve 125. The valve 125 consists of a chamber 127 connected directly to the receiver 11 by the conduit 129 and communicates with the casing 123 through the aperture 131. It is also provided with suitable means for securing the conduit 133 thereto.

Within the chamber 127 is a valve seat 135 on which the valve 137 normally rests, being held there by means of the plunger 139. The end of the chamber 127 is closed by a bushing 141 adapted to receive a second bushing 143. Within the bushing 141 surrounding the plunger 139 is a spring 145 bearing against the head of the plunger 139.

The compression of the spring is adjusted by rotation of the bushing 143. Thus, when the pressure in the receiver tank is sufficient to overcome the compression of spring 145, the valve 137 will be open and permit fluid under pressure to flow into the casing 123 to move the piston 121 and valve 119 to the unloaded position. When the pressure in the receiver tank falls to a point where the compression of the spring is great enough to close the valve 137, the fluid remaining in the casing 123 can escape to the atmosphere through the bushing 143. This path of escape is closed when the valve 137 is open since, at such time, the valve 137 rests on the seat 147.

When valve 137 is open, fluid under pressure may also flow through conduit 133 to the piston casing 149, within which is the reciprocal piston 151. A rod 153 extends into this casing and may be moved to the right under the influence of the pressure of the fluid on the piston 151. When the valve 137 closes, the spring 155 will move the piston 151 to the left permitting the rod 153 also to move to the left. The rod 153 is pivotally connected to lever 65 which is keyed to the throttle spindle 67. Thus, when the pressure in the receiver tank is sufficient to move the piston 151 and rod 153 to the right, the consequent rotation of the lever 65 will move the throttle 69 further toward the closing position. It will thus be seen that when the compressor is unloaded, the speed of the motor is reduced to the minimum idling speed which may be below the speed at which the lever 73 can be of influence in order to prevent racing of the motor. Since both the loaded and unloaded minimum speed may be adjusted, the speeds at which the motor operates may be determined at will by the operator.

With the arrangement of the present invention, it is thus possible to regulate the speed of the unit in accordance with the load on the unit so long as the pressure in the receiver tank does not exceed a predetermined high pressure. When that pressure is reached, the regulation ceases and if that pressure is exceeded, the compressor will be unloaded and the speed of the motor reduced to the minimum or idling speed. Thereafter, when the compression in the receiver tank falls to the reloading pressure, the compressor will reload and the speed of the motor will be increased to a minimum loaded speed. Thereafter, the regulation of the speed will be controlled by the position of the piston 83 after lever 73 has been unlatched.

If, therefore, the tension of spring 91 is adjusted so that the receiver pressure at which latch 99 will lock lever 73 is one hundred pounds per square inch and the pressure at which the surface 111 will raise the latch to unlock the lever 73 is eighty pounds per square inch the regulation of the speed of the compressor, when loaded, will take place when the pressure lies between eighty and one hundred pounds per square inch. When the receiver pressure lies without this pressure range there will be no speed regulation by the piston 83. Adjustment of the bolt 115 will determine the lowest speed at which the compressor will operate when loaded.

Assuming that the pressure at which the valve 137 opens is 105 pounds per square inch then, as the receiver pressure increases, the lever 73 will lock at one hundred pounds per square inch and at 105 pounds per square inch the compressor will be unloaded and movement of piston 151 will change the throttle position to that corresponding to the minimum motor speed. As the pressure drops thereafter, until the pressure is 90 pounds per square inch, the valve 137 will close and reload the compressor and, at the same time, the speed of the compressor will be increased to the lowest speed when the compressor is loaded. A further drop in pressure will unlatch lever 73 allowing piston 83 to regulate the speed and the cycle may be repeated.

Thus, it can be seen, that under normal operating conditions the governor is ineffective to regulate the speed of the motor and will only regulate the motor speed at times when the load demand is high or the receiver pressure low. At such times the governor would act to close the throttle in order to prevent overspeeding of the motor. At other times the speed regulation of the motor will be accomplished by changing the throttle position in accordance with the variations of the receiver pressure.

Obviously, this invention may be modified by those skilled in the art without departing from the scope of the invention and I do not wish to be limited save as defined in the appended claims.

I claim:

1. In a speed regulator for a motor driven fluid compressor unit having a governor and a throttle valve, a pressure responsive device to vary the speed of the compressor unit in accordance with the compressor discharge pressure by regulating the throttle position independently of the governor, means to lock the pressure responsive device at a predetermined low speed position upon a predetermined high discharge pressure when the compressor is loaded, means to unload the compressor at a predetermined maximum discharge pressure and to reload the compressor at a predetermined low discharge pressure, and means to move the throttle to and maintain the throttle at a predetermined minimum speed position when the last means unloads the compressor.

2. In a motor speed regulating apparatus for a motor driven fluid compressor having a fuel throttle valve, a pressure responsive device to control the throttle valve and vary the speed of the motor in accordance with the compressor discharge pressure between a predetermined low and a predetermined high discharge pressure, means to unload and reload the compressor, means to render the pressure responsive device inoperative at a predetermined high discharge pressure, means to change the throttle valve to a predetermined idling speed position when the compressor is unloaded and a governor for the compressor associated with the throttle valve and acting independently of the pressure responsive device.

3. In a motor speed regulating apparatus for a motor driven fluid compressor, a pressure responsive device to vary the speed of the motor within a predetermined range in accordance with variations of the compressor discharge pressure, means to render the pressure responsive device inoperative at a predetermined discharge pressure, means to unload and reload the compressor, and means to change the motor speed to a predetermined speed outside of said predetermined speed range.

4. In a motor speed regulating apparatus for a motor driven fluid compressor, a pressure responsive device to vary the speed of the motor within a predetermined range in accordance with variations of the compressor discharge pressure between a predetermined low and a predetermined high discharge pressure when the compressor is loaded, means to render the pressure responsive device inoperative at the predetermined high discharge pressure, means to unload and reload the compressor, and means to change the motor speed to a predetermined minimum speed outside of said predetermined range when the compressor is unloaded.

5. In a motor speed regulating apparatus for a motor driven fluid compressor, a pressure responsive device to vary the speed of the motor in accordance with variations of the compressor discharge pressure between a predetermined minimum and a predetermined high discharge pressure while the compressor is loaded, means to render the pressure responsive device inoperative to change in motor speed from a predetermined low speed at the predetermined high discharge pressure until the predetermined minimum discharge pressure is reached, means to unload the compressor at a predetermined maximum discharge pressure and to reload the compressor at a predetermined low discharge pressure, and means to change the speed of the motor at minimum speed at the predetermined maximum pressure and maintain the motor at said minimum speed until a predetermined low discharge pressure is reached.

6. In a motor speed regulating apparatus for a motor driven fluid compressor, a pressure responsive device to vary the speed of the motor between a high and low speed in accordance with variations of the compressor discharge pressure between a predetermined minimum and a predetermined high discharge pressure, means to render the pressure responsive device inoperative to change the motor speed from said low speed at the predetermined high discharge pressure, means to unload the compressor at a predetermined maximum discharge pressure and to reload the compressor at a predetermined low discharge pressure, and means to change the speed of the motor to a predetermined minimum speed less than said low speed when the compressor unloads.

7. In a motor speed regulating apparatus for a motor driven fluid compressor having a motor fuel throttle, a pressure responsive device associated with the motor fuel throttle to vary the speed of the motor in accordance with variations of the compressor discharge pressure, means to render the pressure responsive device inoperative to change the motor speed at a predetermined discharge pressure, means to unload and reload the compressor after the pressure responsive device is rendered inoperative, a pressure actuated means to move the motor throttle to a minimum speed position when the compressor is unloaded, and a motor speed governor associated with the motor throttle valve to prevent overspeed.

8. In a motor speed regulating apparatus for a motor driven fluid compressor having a motor speed governor and a motor fuel throttle, a pressure responsive device comprising a casing, a piston in the casing, means to subject the piston to the compressor discharge pressure to move the piston in accordance with variations in said pressure, means to transmit movement of the piston to the throttle to change the speed of the motor in accordance with variations of the compressor discharge pressure, means on the casing to render the piston ineffective at a low speed position when the compressor discharge pressure reaches a predetermined high discharge pressure, means to unload the compressor at a predetermined maximum discharge pressure and to reload the compressor at a predetermined low discharge pressure, means associated with the unloading means to move the throttle to a predetermined minimum speed position when the compressor unloads and maintain the valve in said position until the compressor reloads.

9. In a motor speed regulating apparatus for a motor driven fluid compressor having a motor speed governor and a motor fuel throttle valve, a pressure responsive device subject to and movable by the compressor discharge pressure, means asociated with the governor to transmit movement of the pressure responsive device to the motor fuel throttle valve to vary the speed of the motor in accordance with variations of the compressor discharge pressure, means to render the pressure responsive device inoperative at a predetermined high discharge pressure, means to unload and reload the compressor, means connected to the transmitting means to move the motor fuel throttle valve to a predetermined minimum speed position when the compressor is unloaded, and means forming a part of the transmitting means to enable the throttle valve to move with respect to the motor speed governor.

10. In a motor speed regulating apparatus for a motor driven fluid compressor having a motor speed governor and a motor fuel throttle valve, a movable pressure responsive device actuated by the compressor discharge pressure within a predetermined pressure range, means to transmit movement of the pressure responsive device to said valve to vary the speed of the motor, means to render the pressure responsive device inoperative at the highest pressure of said pressure range, means to unload and reload the compressor at predetermined pressures outside of said pressure range, means associated with the transmitting means to move said valve to a predetermined minimum speed position when the compressor is unloaded and maintain the value in said position until the compressor reloads.

11. In a motor speed regulating apparatus for a motor driven fluid compressor having a motor speed governor and a motor fuel throttle valve and comprising a casing, a piston in the casing actuated by the compressor discharge pressure, a spring to oppose movement of the piston, a lever, a ram on the piston adapted to move the lever upon movement of the piston, a series of levers connecting the throttle valve and the governor movable by the lever to control the throttle valve position, a latch on the casing to hold the lever against movement when the compressor discharge pressure reaches a predetermined high discharge pressure, means to unload and reload the compressor, a pressure responsive device actuated by the unloading means, and means to connect the said device to said series of levers whereby the speed of the motor may be maintained at a predetermined minimum speed by the pressure responsive device upon unloading of the compressor until the compressor is reloaded.

12. In a motor speed regulating apparatus for a motor driven fluid compressor having a motor speed governor and a motor fuel throttle valve comprising a casing, means in the casing actuated by the compressor discharge pressure, means connecting said valve and governor, means associated with the connecting means and actuated by the first said means to control the position of the throttle valve to regulate the speed of the motor, means actuated by the first said means upon a predetermined high discharge pressure to render the last means ineffective at a low speed position, means to unload and reload the compressor, pressure responsive means actuated when the compressor is unloaded, and means in the connecting means to enable the pressure responsive means to maintain the speed of the motor at a predetermined minimum speed upon unloading of the compressor until the compressor reloads.

13. In a motor speed regulating apparatus for a motor driven fluid compressor having a motor speed governor and a motor fuel throttle valve comprising a casing, a pressure responsive means in the casing actuated by the compressor discharge pressure actuated means in the casing, means to transmit movement of the pressure responsive means to the throttle valve connected to the governor, means forming a part of the last said means to enable the governor to move with respect to the pressure responsive device, means to unload and reload the compressor, and a second compressor discharge pressure actuated means to maintain the motor speed at a predetermined minimum speed when the compressor is unloaded.

14. In a motor speed regulating apparatus for a motor driven fluid compressor having a motor speed governor and a motor fuel throttle valve, a pressure responsive device to control the speed of the motor in accordance with the variations in the compressor discharge pressure by varying the position of the throttle, means to connect the throttle valve and governor, means to enable the governor to move with respect to the pressure responsive device, means to render the pressure responsive device ineffective to vary the position of the throttle, means to unload and reload the compressor, a second pressure responsive device actuated by compressor discharge pressure when the compressor unloads to maintain the throttle at a predetermined minimum motor speed position.

15. In a motor speed regulating apparatus for a motor driven fluid compressor having a motor speed governor and a motor fuel throttle valve, movable means to connect the governor and valve, a cushioning means forming a part of said means to enable governor to move with respect to the throttle, pressure responsive means actuated by the compressor discharge pressure associated with and adapted to move the first means to change the throttle valve position and regulate the motor speed, means to unload and reload the compressor, and a second compressor discharge pressure responsive means to actuate a portion of the first means to reduce and maintain the speed of the motor at a predetermined minimum speed when the compressor is unloaded.

16. In a motor speed regulating apparatus for a motor driven fluid compressor, means to govern the speed of the motor, means to control the fuel supplied to the motor, movable means to connect the governor means and the fuel control means, a pressure responsive means to move the connecting means in accordance with variations of the compressor discharge pressure to control the control means and regulate the speed of the motor, means to render the pressure responsive means ineffective to move the connecting means while the compressor is loaded, means to unload and reload the compressor, and compressor discharge responsive means to move the connecting means when the compressor is unloaded and the pressure responsive device is ineffective.

17. In a motor speed regulating apparatus for a motor driven fluid compressor, means to govern the speed of the motor, means to control the fuel supplied to the motor, movable means to connect the governor means and the fuel control means adapted to move the fuel control means to regulate the speed of the motor, means in the last means to enable the governor means to move with respect to the fuel control means, a pressure responsive means to move the connecting means in accordance with variations of the compressor discharge pressure, means to render the pressure responsive means ineffective to move the connecting means, and a second pressure responsive means to move the connecting means to regulate the speed of the motor when the first pressure responsive means is ineffective.

CHARLES S. BAKER.

CERTIFICATE OF CORRECTION.

Patent No. 2,212,631.                                              August 27, 1940.

CHARLES S. BAKER.

It is hereby certified that error appears in the printed specification of the above numbered patent requiring correction as follows: Page 4, first column, line 35, claim 5, for the word "at" read --to a predetermined--; and that the said Letters Patent should be read with this correction therein that the same may conform to the record of the case in the Patent Office.

Signed and sealed this 15th day of October, A. D. 1940.

(Seal)

Henry Van Arsdale,
Acting Commissioner of Patents